(12) United States Patent
Seth et al.

(10) Patent No.: US 11,379,445 B2
(45) Date of Patent: Jul. 5, 2022

(54) SYSTEM AND METHOD FOR ANALYZING AND STRUCTURING DATA RECORDS

(71) Applicant: S-Ancial PTE Ltd, Singapore (SG)

(72) Inventors: Pradip Kumar Seth, Mumbai (IN); Shailendra Raj Mehta, Ahmedabad (IN)

( * ) Notice: Subject to any disclaimer, the term of this patent is extended or adjusted under 35 U.S.C. 154(b) by 186 days.

(21) Appl. No.: 16/543,025

(22) Filed: Aug. 16, 2019

(65) Prior Publication Data

US 2021/0049140 A1 Feb. 18, 2021

(51) Int. Cl.
*G06F 16/30* (2019.01)
*G06F 16/22* (2019.01)
*G06N 20/00* (2019.01)

(52) U.S. Cl.
CPC ............ *G06F 16/22* (2019.01); *G06N 20/00* (2019.01)

(58) Field of Classification Search
CPC .......... G06F 16/22; G06F 16/95; G06F 16/10; G06F 16/221
USPC ................ 707/609, 687, 705, 769, 813, 821
See application file for complete search history.

(56) References Cited

U.S. PATENT DOCUMENTS

| | | | |
|---|---|---|---|
| 9,208,179 B1 * | 12/2015 | Song ....................... | G06F 16/10 |
| 2013/0215116 A1 * | 8/2013 | Siddique ................ | G06Q 20/40 705/26.7 |
| 2016/0210602 A1 * | 7/2016 | Siddique .............. | G06Q 20/384 |
| 2019/0102438 A1 * | 4/2019 | Murray .................. | G06F 16/221 |
| 2020/0184017 A1 * | 6/2020 | Batra ...................... | G06F 16/95 |

* cited by examiner

*Primary Examiner* — Sana A Al-Hashemi
(74) *Attorney, Agent, or Firm* — RC Trademark Company

(57) ABSTRACT

Disclosed is a system for analyzing and structuring data records, wherein the system comprises a server arrangement operable to: extract data records from publicly available data sources; identify a class of each of the data records; analyze one or more parameters related to each of the data records to calculate a data potency score for each of the data records, wherein the one or more parameters that are analyzed for a data record are selected based on the class of the data record; tag the data potency score with data record corresponding thereto; process the data records with corresponding tagged data potency scores into a uniform format; and store the processed data records in a database arrangement as structured data records.

11 Claims, 2 Drawing Sheets

SYSTEM AND METHOD FOR ANALYZING AND STRUCTURING DATA RECORDS

TECHNICAL FIELD

The present disclosure relates generally to data processing; and more specifically, to systems for analyzing and structuring data records. Moreover, the present disclosure relates to methods for analyzing and structuring data records.

BACKGROUND

In the past few decades, global as well as domestic markets have witnessed an enormous increase in number of companies and organizations operating in different domains such as finance, real estate, production, and the like. Such companies and organizations provide data records related to various aspects (for example, work domain, services, brands, investors, and the like) associated thereto in public domain. Examples of data records provided in the public domain include, but are not limited to: a balance sheet, an income statement, a cashflow statement and a net worth report. The data records provided by the companies and organizations affect the company in terms of image, business, credibility, investment, endorsements and so forth.

Generally, a given entity (for example, an investor, an organization and the like) willing to associate with said company considers the data records for reference before actually associating with the company. The given entity analyses the data records in order to determine information, such as profitability, turn around, partners, investors and the like, about the company. The given entity may associate with the company, for example, by hiring the company for service(s), by investing in the company, by biding for a tender and the like. The data records provide the given entity with an insight about credibility and profitability of the company. The given entity, based on the analyzed data records, makes a decision regarding a future association with the company.

However, the given entity analyses the data records manually which requires time and manual effort. In addition, the data records provided by the company may be biased and may not provide correct information. Therefore, the given entity may not be able to make a correct decision regarding the future association with the company. Furthermore, lack of a neutral party for providing and/or verifying the data records resists the given entity in having confidence on credibility of the company. Moreover, analyzing the data records may be done manually that requires effort and time. In addition, such manual analysis of the data records is prone to error and may require further review.

Therefore, in light of the foregoing discussion, there exists a need to overcome the aforementioned drawbacks associated with current approach for analyzing and structuring data records.

SUMMARY

The present disclosure seeks to provide a system for analyzing and structuring data records. The present disclosure also seeks to provide a method for analyzing and structuring data records. The present disclosure seeks to provide a solution to the existing problem of lack of unbiased and neutral party for analyzing the data records associated with an entity. Moreover, the present disclosure also seeks to provide a solution to manual and time-consuming analysis of the data records associated with the entity. An aim of the present disclosure is to provide a solution that overcomes at least partially the problems encountered in prior art, and provides an automated and seamless approach of analyzing and structuring the data records associated with the entity.

In one aspect, an embodiment of the present disclosure provides a system for analyzing and structuring data records, wherein the system comprises a server arrangement operable to:

extract data records from publicly available data sources;
  identify a class of each of the data records;
  analyze one or more parameters related to each of the data records to calculate a data potency score for each of the data records, wherein the one or more parameters that are analyzed for a data record are selected based on the class of the data record;
  tag the data potency score with data record corresponding thereto;
  process the data records with corresponding tagged data potency scores into a uniform format; and
  store the processed data records in a database arrangement as structured data records.

In another aspect, an embodiment of the present disclosure provides a method for analyzing and structuring data records, wherein the method is implemented using a server arrangement, wherein the method comprises:

extracting data records from publicly available data sources;
  identifying a class of each of the data records;
  analyzing one or more parameters related to each of the data records to calculate a data potency score for each of the data records, wherein the one or more parameters that are analyzed for a data record are selected based on the class of the data record;
  tagging the data potency score with data record corresponding thereto;
  processing the data records with corresponding tagged data potency scores into a uniform format; and
  storing the processed data records in a database arrangement as structured data records.

Embodiments of the present disclosure substantially eliminate or at least partially address the aforementioned problems in the prior art, and enable an automated and simple approach for analyzing and structuring the data records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
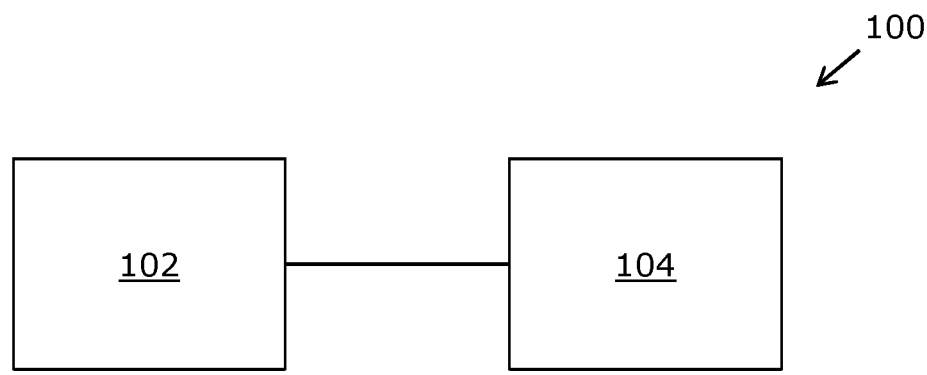
FIG. 1 illustrates block diagram of architecture of a system for analyzing and structuring data records, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for analyzing and structuring data records, wherein the system comprises a server arrangement operable to:
  extract data records from publicly available data sources;
  identify a class of each of the data records;
  analyze one or more parameters related to each of the data records to calculate a data potency score for each of the data records, wherein the one or more parameters that are analyzed for a data record are selected based on the class of the data record;
  tag the data potency score with data record corresponding thereto;
  process the data records with corresponding tagged data potency scores into a uniform format; and
  store the processed data records in a database arrangement as structured data records.

In another aspect, an embodiment of the present disclosure provides a method for analyzing and structuring data records, wherein the method is implemented using a server arrangement, wherein the method comprises:
  extracting data records from publicly available data sources;
  identifying a class of each of the data records;
  analyzing one or more parameters related to each of the data records to calculate a data potency score for each of the data records, wherein the one or more parameters that are analyzed for a data record are selected based on the class of the data record;
  tagging the data potency score with data record corresponding thereto;
  processing the data records with corresponding tagged data potency scores into a uniform format; and
  storing the processed data records in a database arrangement as structured data records.

The present disclosure provides the aforementioned system and the aforementioned method. The aforementioned system provides a neutral and unbiased insight of an entity by analyzing and structuring data records associated therewith. In addition, the neutral and unbiased insight of the company establishes a credibility and authenticity thereof among the stakeholders of the company. Furthermore, the aforementioned system provides for an automated analysis and structuring of the data records that saves manual effort and time consumption. Notably, the system is implementable using existing hardware infrastructure. Moreover, the method disclosed herein is seamless and platform independent.

Pursuant to embodiments of the present disclosure, the system and method as disclosed herein enable structuring and analysis of publicly available data records (such as, unstructured data records on the Internet). The present disclosure discloses the server arrangement operable to analyze data records to calculate the data potency score for each of the data records. Beneficially, such data potency score calculated for each of the data records provide an estimate of the quality of content in the data record, as explained in detail herein later.

Optionally, the system for analyzing and structuring data records is implemented as an independent web-platform. More optionally, the system for automated document generation is implemented as a part of a web-platform, wherein the web-platform provides additional services. In an example, the system for analyzing and structuring data records is implemented in conjunction with a web-platform enabling online capital market workflow, wherein the web-platform establishes channel for seamless communication between personnel (comprising, for example, corporates, corporate representatives, buy-side personnel (for example, investment manager), sell-side personnel (for example, research analyst), individual investors, and so forth) and/or bot(s) operating the system. In this regard, the web-platform may further provide a comprehensive platform that creates the database arrangement storing structured data records (as discussed later, herein), enables personnel and/or bot(s) to network, enables personnel and/or bot(s) to organize and track events, enables personnel and/or bot(s) to obtain recorded conference calls organized by, for example, government bodies, assess data records provided by the personnel and/or bot(s), builds profile for personnel and/or bot(s), and enhances an overall reliability and trust for the personnel and/or bot(s). Additionally, the web-platform may enable customer relationship management thereon. Beneficially, such web-platform enables personnel of financial community to develop a deeper understanding of capital market, enhance outreach of companies, enable better research of financial market, better results (namely, profits) for investing personnel and better results for advising personnel (namely, financial managers, brokers, and the like).

The system for analyzing and structuring data records comprises the server arrangement. Throughout the present disclosure, the term "server arrangement" relates to a structure and/or a module that includes programmable and/or non-programmable components configured to store, process and/or share information. Notably, the server arrangement includes any arrangement of physical or virtual computational entities capable of processing information to perform various computational tasks. Furthermore, it will be appreciated that the server arrangement may be both single hardware server and/or plurality of hardware servers operating in a parallel or distributed architecture. In an example, the server may include components such as memory, a processor, a database, a network adapter and the like, to store, process and/or share information with other computing components, such as a user device/user equipment.

Optionally, the processor includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processor" may refer to one or more individual processors, processing devices and various elements associated with a processing device that may be shared by other processing devices.

In an exemplary implementation of the present disclosure, the system described herein analyses and structures data records related to financial and capital markets. In such implementation, the data records may include documents such as annual reports of companies involved in the markets, valuation data, stock exchange trends, press releases and so forth.

The server arrangement is operable to extract data records from publicly available data sources. Notably, the server arrangement processes publicly available data sources comprising non-proprietary data records. Specifically, such data records are available in the public domain for analysis and use without any requirement of licensing or data use agreements. Furthermore, the server arrangement identifies or receives a user-input relating to the type and/or field of data records to be extracted. Subsequently, the server arrangement identifies the publicly available data sources related to the type and/or the field of data records to be extracted. Thereafter, the server arrangement retrieves the data records from the identified publicly available data sources. Moreover, the server arrangement may employ data extraction and parsing tools such as Scrapy, Beautiful Soup and the like to extract and parse data from publicly available data sources. It will be understood by a person skilled in the art that various techniques of data extraction and parsing techniques may be implemented to extract the data records.

Optionally, the system extracts the data records from the publicly available data sources (such as, open data repositories (for example, World Bank open data, World Health Organization (WHO) open data repository, Google Public Data Explorer, Amazon Web Services (AWS), Registry of Open Data (RODA) on AWS, FiveThirtyEight, DBpedia, Yelp dataset, Kaggle, and so forth), websites, and so forth) by crawling such data sources. In this regard, web-crawling framework, for example, Scrapy, Beautiful Soup, Selenium, Splash, Lua script, a combination thereof, may be employed to extract data records from the publicly available data sources Optionally, extracting data records from the publicly available data sources comprises cleaning and/or translating the data records. Specifically, cleaning the data records refers to removal of unnecessary comments, annotations, symbols, images and/or a combination thereof from the data records. More specifically, the processor extracts only relevant information from the existing data sources. Moreover, translating the data records refers to conversion of content in the data records to a machine-readable format. Beneficially, cleaning and/or translating the data records reduces processing complexity thereof. Additionally, cleaning and/or translating the data records also reduces processing time for structuring the data records.

Optionally, the server arrangement is operable to perform optical character recognition on data records having an image format or a portable document format. Specifically, optical character recognition is performed to extract content from such data records. Such optical character recognition techniques are known in the art.

The server arrangement is operable to identify a class of each of the data records. In one embodiment, the class of a data record is based on the format of the data record. Notably, a given data record has one of a plurality of formats for example, such as a spreadsheet, a digital document, an image, an audio file, a video file. Therefore, the server arrangement assign an identical class to data records having a same format. It will be appreciated that the analysis of a data record is performed based on the class of the data record, namely based on the format of the data record. In another embodiment, the class of the data record is determined based on the type of the data record. Specifically, the type of the data record refers to topic of contents included in the data record. More specifically, if the data records extracted from the publicly available data sources relate to a specific domain, the types of data records extracted is finite. For example, for data records relating to the financial market, type of data records may be a finite set containing website data, annual report, corporate website data, corporate presentations, investor presentation, earning presentation, press release, earning release, media kit, investor kit, and factsheet. Therefore, the class of the data record is identified as one of the type of the data record.

Optionally, the server arrangement is operable to classify the data records into one or more data segments, wherein data records having an identical class are classified into a given data segment. In other words, the data records are classified into one or more data segments in a manner that each data segment comprises data records having an identical class. For example, a given data segment may comprise data records with the class 'image', wherein the given data segment comprises data records having an image format.

The server arrangement is operable to analyze one or more parameters related to each of the data records to calculate a data potency score for each of the data records, wherein the one or more parameters that are analyzed for a data record are selected based on the class of the data record. Notably, the one or more parameters related to a data record refer to attributes of the data record including, but not limited to, contents of the data record, one or more sections of the data record, design of the data record, metadata associated with the data record. Specifically, each of such attributes of the data record are analyzed to obtain the data potency score of the data record. It will be appreciated that the one or more parameters provide characteristic information about quality and reliability of the content in the data record. Therefore, the data potency score of the data record provide a substantially accurate measure of quality of the data record. In an embodiment, the one or more parameters that are analyzed for a data record vary based on the format of the data record. In an example, the data record has a class 'image'. Consequently, the one or more parameters that are analyzed for such data record are design, structure, dimensions and the like. In another example, the data record has a class 'digital document'. In such example, the one or more parameters that are analyzed for such data record are one or more sections thereof, content of the data record and the like. In another embodiment, the class of the record is determined based on the type of the data record. Therefore, in such embodiment, the one or more parameters related to each type of the data record may be predefined. Consequently, the data record is analyzed with respect to such predefined one or more parameters to obtain the data potency score for the data record.

In an example, the data record is an annual report of a corporation available on the website thereof. The server arrangement extracts the annual report from the website, available in a portable document format (PDF). In such example, the class of the data record is determined as 'Annual Report'. Thereafter, the server arrangement analyses the annual report with respect to the one or more parameters predefined for the class 'Annual Report'. Specifically, the predefined one or more parameters related to the annual report include various sections for example, such as Focus areas, Strategies, Business Models, Investment propositions and the like. Consequently, contents of each of such predefined parameters (herein, sections) in the data record are analyzed to determine the data potency score of the data record.

Optionally, the server arrangement determines a parameter score corresponding to each of the one or more parameters, wherein the parameter scores related to the one or more parameters for a data record are compiled to obtain the data potency score for the data record. Specifically, each of the one or more parameters are analyzed and a parameter score is determined for each parameter. In the aforementioned example, the one or more parameters related to the annual report include various sections for example, such as Focus areas, Strategies, Business Models, Investment propositions and the like. Therefore, contents of each of the sections is analyzed and a parameter score is provided to each of the section. Specifically, contents of each section (namely, parameter) are compared with the predefined parameters for the class and a parameter score is provided there-for. For example, the class of the data record i.e. 'Annual Report', the one or more parameters may be predefined as 'Highlights', 'Contents', 'Company Overview', 'Strategic Reporting', 'Director's report and MD&A', 'Corporate Governance', 'Sustainability', 'Financial Statements', 'Shareholder Information'. Therefore, the annual report is analyzed with respect to the aforementioned one or more parameters that are predefined. Specifically, contents of each of the one or more parameters in the annual report are analyzed to determine a parameter score there-for. For example, contents of the parameter (namely, section) 'Strategic Reporting' in the annual report are analyzed and a parameter score for the parameter 'Strategic Reporting' is determined. Similarly, parameter scores for each of the one or more parameters are determined and compiled to obtain the data potency score. Specifically, in one example, compiling the parameter scores comprises averaging the values of the parameter scores. In another example, each of the parameter score has a predetermined weightage in the data potency score. Therefore, the value of a given parameter score is multiplied by associated predetermined weightage of the given parameter to obtain its contribution to the data potency score.

The server arrangement is operable to tag the data potency score with data record corresponding thereto. Specifically, the data potency score calculated for the corresponding to the data record is associated with the data record by the server arrangement. The data potency score may be stored as a part of the metadata of the data record.

The server arrangement is operable to process the data records with corresponding tagged data potency scores into a uniform format. Notably, each data record to be stored in the database arrangement is processed into the uniform format thereby enabling the system to manage, parse and retrieve data records efficiently. In an instance, each data record is converted to, for example, a .csv file, a .text file, or a .html file.

Furthermore, the server arrangement is operable to store the processed data records in the database arrangement as structured data records. It will be appreciated that the plurality of processed data records may be stored in one or more databases of the database arrangement. In this regard, optionally, different databases of the database arrangement may comprise different data from the plurality of data records based on different use of the different databases. In an instance, different formats of files associated with the plurality of data records may be stored in different databases. In another instance, different category or type of files associated with the plurality of data records may be stored in different databases. In such case, a first database may store a number of data records relating to investor presentation, a second database may store a number of data records relating to press release, and a third database may store a number of data records relating to company profile. As described herein, the term "database arrangement" relates to an organized body of digital information regardless of the manner in which the data or the organized body thereof is represented. Optionally, the database may be hardware, software, firmware and/or any combination thereof. For example, the organized body of related data may be in the form of a table, a map, a grid, a packet, a datagram, a file, a document, a list or in any other form.

Optionally, the server arrangement is further operable to:
determine, using the parameter scores for a data record, at least one parameter in the data record that is to be amplified;
receive a user-input related to amplification of the at least one parameter in the data record;
append the user-input related to the amplification in the data record; and
process the appended data records into a uniform format and store in the database arrangement.

Optionally, in this regard, each of the parameter score provides an estimate on the parameters (namely, attributes) of the data records that have a scope of amplification (namely, improvement). Consequently, a user having an ownership or authority of the data record may provide a user-input relate to amplification of the at least one parameter in the data record. Such user-input may be in the form of a text, image, audio and so forth. Consequently, such user-input related to the amplification is appended in the data record. Subsequently, the appended data record is processed into the uniform format, as aforementioned and stored in the database arrangement.

Optionally, the server arrangement is operable to generate a data potency report for each of the data records based on the corresponding data potency scores thereof. Specifically, the server arrangement is operable to generate the data potency report upon receiving a request. More specifically, the data potency report comprises information relating to the data potency score and optionally, the parameter scores relating to the one or more parameters. Beneficially, the data potency report provides a measure of the quality and reliability of the report and further provides an insight relating to the parameters that can be improved (namely, amplified).

Optionally, the server arrangement employs machine learning algorithms to analyze one or more parameters related to the data records. Notably, the server arrangement employs supervised learning and/or unsupervised learning to train the system to analyze the one or more parameters related to the data records and provide data potency scores thereafter. Specifically, the server arrangement employs labelled data sets comprising data records with predetermined data potency score as an input to the machine learning algorithms, wherein the machine learning algorithms over sustained periods of training recognize patterns in the training data sets and thereafter, may perform analysis of the data records based on the training.

More optionally, the machine learning algorithms are operable to employ cognitive recognition techniques to analyze a content of the data record that is not defined by one or more parameter. In this regard, the machine learning algorithms used by the server arrangement uses the cognitive recognition technique to automatically analyze the content of the data record based on a context thereof. Beneficially, analyzing context of the content enables categorization of the content into one or more parameters in an event of inadequate information associated with the content.

Optionally, the server arrangement is operable to:
analyze data potency scores for data records related to an entity over a sustained period of time;
obtain at least one factor related to the entity over the sustained period of time; and
plot the data potency scores with respect to the at least one factor related to the entity.

Optionally, in this regard, the term "entity" refers to an individual, a group of individual, an organization or a group of organizations having data records relating thereto. Specifically, over a sustained (namely, continuous) period of time, the data potency scores of data records related to the entity are analyzed. Simultaneously, the server arrangement obtains values of at least one factor related to the entity over the sustained period of time. The at least one factor may include, but is not limited to, valuation or net worth of the entity, market trust of the entity, stock market values of the entity. Subsequently, the server arrangement plots the data potency scores with respect to the at least one factor related to the entity. Beneficially, such plotting of the data potency scores with respect to the at least one factor provides an insight on the progress and development of the entity and factors related thereto. Furthermore, such plot provides a correlation between the data potency scores and the at least one factor, enabling an analysis of influence of the data potency scores over the at least one factor.

The present disclosure also relates to the method as described above. Various embodiments and variants disclosed above apply mutatis mutandis to the method.

Optionally, the method comprises determining a parameter score corresponding to each of the one or more parameters, wherein the parameter scores related to the one or more parameters for a data record are compiled to obtain the data potency score for the data record.

Optionally, the method further comprises:
determining, using the parameter scores for a data record, at least one parameter in the data record that is to be amplified;
receiving a user-input related to amplification of the at least one parameter in the data record;
appending the user-input related to the amplification in the data record; and
processing the appended data records into a uniform format and storing in the database arrangement.

Optionally, the method further comprises generating a data potency report for each of the data records based on the corresponding data potency scores thereof.

Optionally, the method further comprises employing machine learning algorithms to analyze one or more parameters related to the data records.

Optionally, the method further comprises:
analyzing data potency scores for data records related to an entity over a sustained period of time;
obtaining at least one factor related to the entity over the sustained period of time; and
plotting the data potency scores with respect to the at least one factor related to the entity.

In yet another aspect, embodiments of the present disclosure further provide a computer program product comprising non-transitory computer-readable storage media having computer-readable instructions stored thereon, the computer-readable instructions being executable by a computerized device comprising processing hardware to execute a method for structuring and analyzing data records.

DETAILED DESCRIPTION OF THE DRAWINGS

Referring to FIG. 1, illustrated is a block diagram of architecture of a system 100 for analyzing and structuring data records, in accordance with an embodiment of the present disclosure. The system 100 comprises a server arrangement 102; and a database arrangement 104 communicably coupled to the server arrangement 102.

The server arrangement 102 is operable to:
extract data records from publicly available data sources;
identify a class of each of the data records;
analyze one or more parameters related to each of the data records to calculate a data potency score for each of the data records, wherein the one or more parameters that are analyzed for a data record are selected based on the class of the data record;
tag the data potency score with data record corresponding thereto;
process the data records with corresponding tagged data potency scores into a uniform format; and
store the processed data records in the database arrangement 104 as structured data records.

Figure 2A:
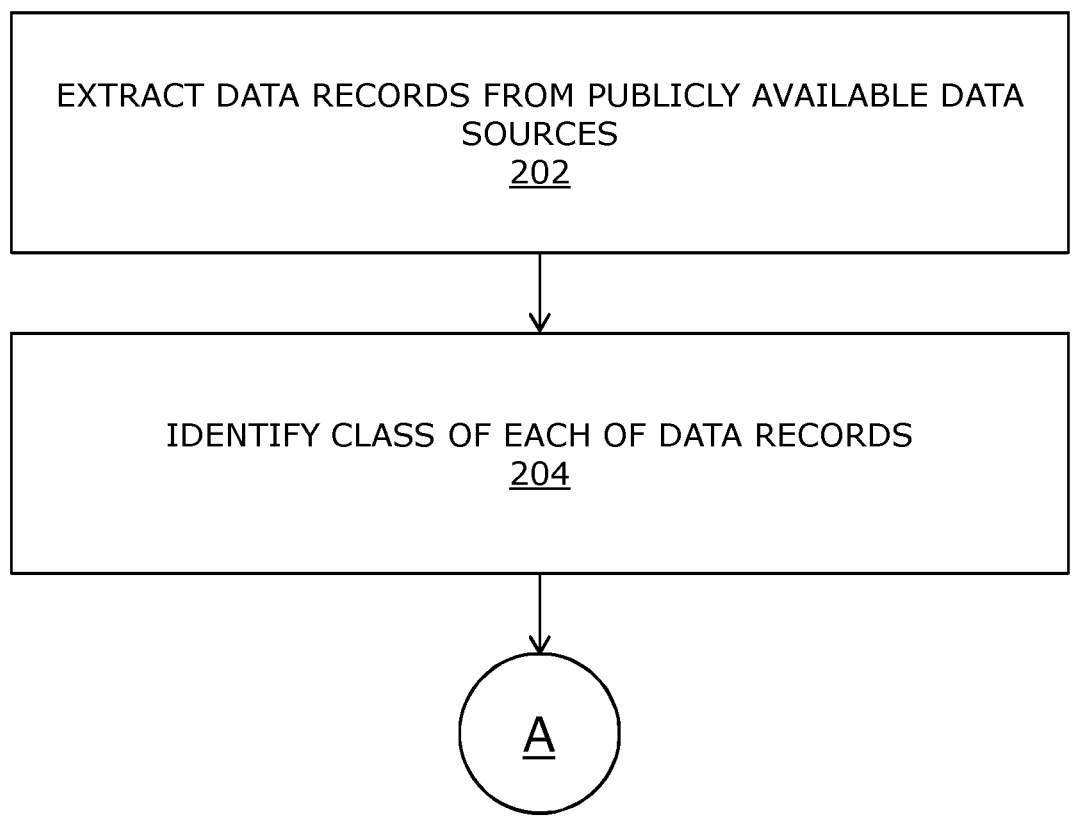
FIGS. 2A and 2B collectively illustrate steps of a method for analyzing and structuring data records, in accordance with an embodiment of the present disclosure.
Figure 2B:
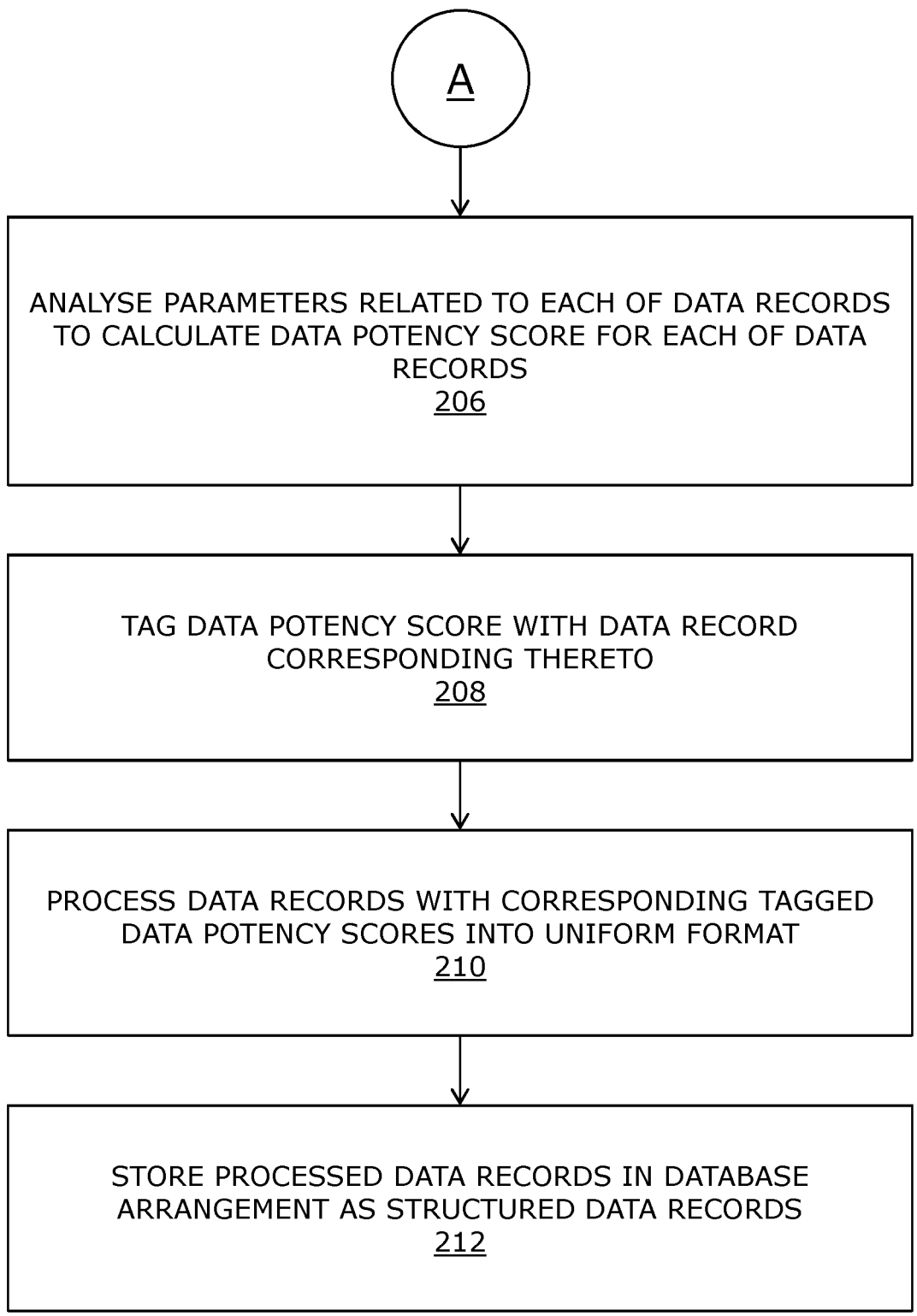

Referring to FIGS. 2A and 2B, collectively illustrate steps of a method for analyzing and structuring data records, in accordance with an embodiment of the present disclosure. At step 202, data records from publicly available data sources are extracted. At step 204, a class of each of the data records is identified. At step 206, one or more parameters related to each of the data records are analyzed to calculate a data potency score for each of the data records. The one or more parameters that are analyzed for a data record are selected based on the class of the data record. At step of 208, the data potency score is tagged with data record corresponding thereto. At step 210, the data records are processed with corresponding tagged data potency scores into a uniform format. At step 212, the processed data records are stored in a database arrangement as structured data records.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for analyzing and structuring data records, wherein the system comprises a server arrangement operable to:
extract the data records from publicly available data sources;
identify a class for each of the data records, wherein the class comprises a format of the data record or a type of the data record, wherein the format of the data record comprises one of: a spreadsheet, a digital document, an image, an audio file or a video file, and wherein the type of the data record refers to topic of contents included in the data record;

analyze one or more parameters related to each of the data records to calculate a data potency score for each of the data records, wherein the one or more parameters that are analyzed for each of the data records are selected based on the class of the data record, wherein the data potency score for each of the data records provides an estimate of quality of content in the data record;

tag the data potency scores with the data records corresponding thereto;

process each of the data records with corresponding tagged data potency scores into a uniform format;

store the processed each of the data records in a database arrangement as structured data records;

analyze the data potency scores for the data records related to an entity over a sustained period of time;

obtain at least one factor related to the entity over the sustained period of time, wherein the at least one factor comprises at least one of: valuation of the entity, market trust of the entity, and stock market values of the entity; and plot the data potency scores with respect to the at least one factor related to the entity, wherein the plot provides a correlation between the data potency scores and the at least one factor.

2. A method for analyzing and structuring data records, wherein the method is implemented using a server arrangement, wherein the method comprises:

extracting the data records from publicly available data sources;

identifying a class for each of the data records, wherein the class comprises a format of the data record or a type of the data record, wherein the format of the data record comprises one of: a spreadsheet, a digital document, an image, an audio file or a video file, and wherein the type of the data record refers to topic of contents included in the data record;

analyzing one or more parameters related to each of the data records to calculate a data potency score for each of the data records, wherein the one or more parameters that are analyzed for each of the data records are selected based on the class of the data record, wherein the data potency score for each of the data records provides an estimate of quality of content in the data record;

tagging the data potency scores with the data records corresponding thereto;

processing each of the data records with corresponding tagged data potency scores into a uniform format;

storing the processed each of the data records in a database arrangement as structured data records;

analyzing the data potency scores for the data records related to an entity over a sustained period of time;

obtaining at least one factor related to the entity over the sustained period of time, wherein the at least one factor comprises at least one of: valuation of the entity, market trust of the entity, and stock market values of the entity; and plotting the data potency scores with respect to the at least one factor related to the entity, wherein the plot provides a correlation between the data potency scores and the at least one factor.

3. The system of claim 1, wherein the server arrangement determines a parameter score corresponding to each of the one or more parameters, wherein the parameter scores related to each of the one or more parameters for the data record are compiled to obtain the data potency score for the data record.

4. The system of claim 1, wherein the server arrangement is operable to generate a data potency report for each of the data records based on the corresponding data potency scores thereof.

5. The system of claim 1, wherein the server arrangement employs machine learning algorithms to analyze the one or more parameters related to the data records.

6. The method of claim 2, wherein the method comprises determining a parameter score corresponding to each of the one or more parameters, wherein the parameter scores related to each of the one or more parameters for the data record are compiled to obtain the data potency score for the data record.

7. The method of claim 2, wherein the method further comprises generating a data potency report for each of the data records based on the corresponding data potency scores thereof.

8. The method of claim 2, wherein the method further comprises employing machine learning algorithms to analyze the one or more parameters related to the data records.

9. A computer program product comprising non-transitory computer-readable storage media having computer-readable instructions stored thereon, the computer-readable instructions being executable by a computerized device comprising processing hardware to execute a method of claim 2.

10. The system of claim 3, wherein the server arrangement is further operable to:

determine, using the parameter scores for the data record, at least one parameter in the data record that is to be amplified;

receive a user-input related to amplification of the at least one parameter in the data record;

append the user-input related to the amplification in the data record; and process the appended data records into a uniform format and store in the database arrangement.

11. The method of claim 6, further comprising:

determining, using the parameter scores for the data record, at least one parameter in the data record that is to be amplified;

receiving a user-input related to amplification of the at least one parameter in the data record;

appending the user-input related to the amplification in the data record; and processing the appended data records into a uniform format and storing in the database arrangement.

* * * * *